US009722717B2

(12) United States Patent
Landau et al.

(10) Patent No.: US 9,722,717 B2
(45) Date of Patent: Aug. 1, 2017

(54) TECHNOLOGIES FOR ETHERNET LINK ROBUSTNESS FOR DEEP SLEEP LOW POWER APPLICATIONS

(71) Applicant: Intel Corporation, Santa Clara, CA (US)

(72) Inventors: Yoni Landau, Or-Aqiva (IL); Assaf Benhamou, Haifa (IL); Adee O. Ran, Maayan Baruch (IL)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 14/574,482

(22) Filed: Dec. 18, 2014

(65) Prior Publication Data
US 2016/0182175 A1 Jun. 23, 2016

(51) Int. Cl.
H04L 12/12 (2006.01)
H04J 3/06 (2006.01)
H04L 7/04 (2006.01)

(52) U.S. Cl.
CPC ............ H04J 3/0658 (2013.01); H04L 12/12 (2013.01); H04L 7/041 (2013.01); H04L 2007/045 (2013.01); Y02B 60/34 (2013.01); Y02B 60/35 (2013.01)

(58) Field of Classification Search
CPC ............................ H04L 3/0658; H04L 7/0741
USPC .......................................................... 370/514
See application file for complete search history.

(56) References Cited

U.S. PATENT DOCUMENTS 5,926,629 A * 7/1999 Gulick .................. G06F 13/423
370/402
2015/0363212 A1* 12/2015 Gupta ....................... G06F 9/54
713/100

* cited by examiner

Primary Examiner — Dang Ton
(74) Attorney, Agent, or Firm — Barnes & Thornburg LLP

(57) ABSTRACT

Technologies for robust data transmission include a network port logic having a physical coding sublayer (PCS). The PCS may transmit a series of rapid alignment markers (RAMs) to a link partner, with each RAM indicative of a counter value. The PCS transitions to a sleep state if the counter value equals two and a low power idle (LPI) command is set by an upper-layer client. The PCS transitions to an active state if the counter value equals one and the LPI command is not set. The PCS may receive a low power idle symbol (LI) from the link partner and start a guard timer in response to receipt of the LI symbol. The PCS transitions to a sleep state if the guard timer expires and transitions to the active state if data other than LI is received prior to expiration of the guard timer. Other embodiments are described and claimed.

22 Claims, 7 Drawing Sheets

TECHNOLOGIES FOR ETHERNET LINK ROBUSTNESS FOR DEEP SLEEP LOW POWER APPLICATIONS

BACKGROUND

Recent Ethernet standards such as IEEE standard 802.3bj-2014 define physical layers (PHY) for 100-gigabit and 40-gigabit communications over backplane and copper cable assemblies. The standards also define optional modes for energy efficient Ethernet (EEE). In particular, a transmitter may enter a low-power idle (LPI) state when the transmitter has no data to transmit. In the LPI state, the transmitter may power down the transmitter and then periodically power up the transmitter to refresh the communication link. The transmitter may leave the LPI state at any time. However, in certain scenarios, transitioning out of the LPI state may cause short-term deadlocks or other timing errors with the remote link partner, causing data loss and potentially causing the link to be dropped. For example, exiting the LPI state during a particular window of time of a link refresh may cause data loss. Based on the length of the window and the link refresh cycle time, data loss may occur once for every 12,272 exits from the LPI state.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
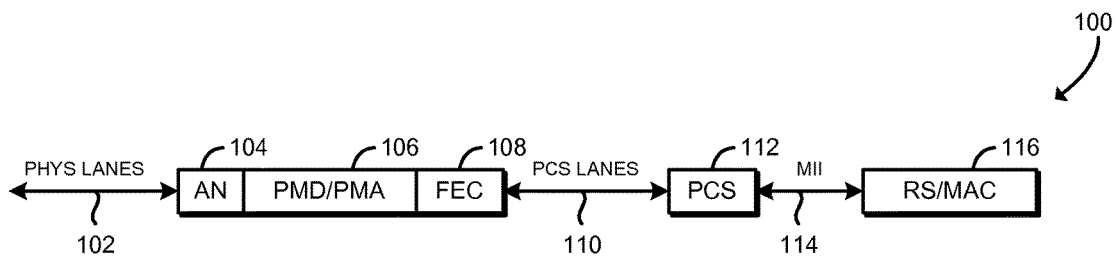
FIG. 1 is a simplified block diagram of at least one embodiment of Ethernet port logic for robust transitions out of deep sleep.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, an Ethernet port logic 100 is capable of communication over one or more physical communication lanes 102 to a remote link partner. The remote link partner may be embodied as another Ethernet port logic 100 or as any other compatible network device. The Ethernet port logic 100 may support low-power idle (LPI) mode for data transmission and/or data reception. For transmitting data, the Ethernet port logic 100 may enter the low-power idle state, for example, when there is no data for transmission or when otherwise commanded to enter the low-power idle state. In the low-power idle state, the Ethernet port logic 100 powers down a transmission circuit or otherwise enters a reduced-power state. Periodically, the Ethernet port logic 100 refreshes the communication lane 102 by powering on the transmission circuit and transmitting a series of rapid alignment markers (RAMs) to the remote link partner. The RAMs include a counter value ranging from an initial value (e.g., 255) down to a final value (e.g., one). After transmitting the next-to-last RAM (e.g., the RAM having a counter value equal to two), the Ethernet port logic 100 determines whether to remain in the low-power idle state. If so, the Ethernet port logic 100 transmits RAMs including the initial value (e.g., 255). If the Ethernet port logic 100 determines to exit the low-power idle state after transmitting the next-to-last RAM (for example, if data has been provided for transmission), the Ethernet port logic 100 transmits the last RAM (e.g., the RAM having a counter value equal to one) and then exit the low-power idle state. For receiving data, the Ethernet port logic 100 may monitor for low-power idle symbols (LI) received from the remote link partner. In response to receiving an LI symbol, the Ethernet port logic 100 starts a guard timer for a relatively short time period (e.g., 500 ns). After expiration of the guard timer, the Ethernet port logic 100 determines whether the remote link partner continues to transmit the LI symbol. If not, the Ethernet port logic 100 continues in the active, full-power state. If the LI symbol is still received from the remote link partner, the Ethernet port logic 100 enters a sleep state or a reduced-power state.

Thus, the illustrative Ethernet port logic 100 coordinates transmission of the last RAM with the transition out of the low-power idle mode. Coordinating transmission of the last RAM with transition out of the low-power idle mode may reduce or eliminate certain short-term deadlocks or timing errors that may be induced in the remote link partner. For example, by coordinating transmission of the last RAM with the transition out of the low-power idle mode, the Ethernet port logic 100 may not determine to exit the low-power idle mode after transmitting the last RAM but before completing a link refresh. Similarly, the Ethernet port logic 100 reduces or eliminates short-term deadlocks or timing errors if the remote link partner stops transmitting the LI symbol shortly after transmitting the last RAM. Accordingly, the Ethernet port logic 100 may provide a reliable communication link even when the LPI state is disabled during a link refresh. Additionally, the low-power transmission and/or low-power reception processes of the Ethernet port logic 100 may be fully interoperable with remote link partners that implement the IEEE standard 802.3bj-2014. Thus, the Ethernet port logic 100 may improve overall link robustness and reliability without requiring changes to existing devices.

The illustrative Ethernet port logic 100 includes an auto-negotiation module 104, a physical medium dependent (PMD) sublayer/physical medium attachment (PMA) sublayer 106, a forward error correction (FEC) sublayer 108, a physical coding sublayer (PCS) module 112, and a reconciliation sublayer/media access control sublayer (MAC) module 116. Additionally, in some embodiments, one or more of the illustrative components may be incorporated in, or otherwise form a portion of, another component. For example, part or all of the auto-negotiation module 104, the PMD/PMA 106, and/or the FEC 108 may be incorporated in the PCS 112.

The communication lanes 102 may be embodied as any one or more computer communication links. For example, each communication lane 102 may be embodied as a twisted pair conductor or an electrical backplane connection. In some embodiments, each communication lane 102 may be capable of full-duplex operation. For example, each communication lane 102 may include two pairs of electrical conductors, one pair for transmitting data and the other pair for receiving data. Illustratively, the communication lanes 102 may include four communication lanes 102 operating at 10 Gb/s each, four communications lanes 102 operating at 25 Gb/s each, or ten communication lanes 102 operating at 10 Gb/s each (for 40 Gb/s, 100 Gb/s, and 100 Gb/s total bandwidth, respectively). Although described as operating at a data rate such as 10 Gb/s, it should be understood that in some embodiments the communications lanes 102 may operate at a slightly higher signaling rate such as 10.3125 Gb/s, to allow for additional data for line encoding, error correction, and other additional data.

The auto-negotiation module 104 is configured to auto-negotiate line transmission speed, mode of operation, and other communication parameters with a link partner when the communication lane 102 is brought up. The auto-negotiation module 104 may be embodied as a state machine or other logic capable of implementing an auto-negotiation protocol. For example, the auto-negotiation module 104 may implement the auto-negotiation protocol specified by clause 73 of the IEEE 802.3 specification, clause 37 of the IEEE 802.3 specification, or the serial gigabit media independent interface (SGMII) auto-negotiation protocol. Although illustrated in FIG. 1 as coupled between the PMD/PMA 106 and the communication lanes 102, in other embodiments the auto-negotiation module 104 may be included at different positions in the Ethernet port logic 100. For example, in some embodiments the auto-negotiation module 104 may be coupled between the PMD/PMA 106 and the FEC 108.

The MAC 116 is configured to transmit Ethernet frame data to the PCS 112 to be encoded and transmitted, and to receive data from the PCS 112 to produce Ethernet frame data. The MAC 116 communicates with the PCS 112 via a media-independent interface 114. For example, the MAC 116 may communicate via a 40 gigabit media independent interface (XLGMII), a 100 gigabit media independent interface (CGMII), or any appropriate interface. The MAC 116 may perform Ethernet frame detection and validation, packet reception and transmission, cyclic redundancy check (CRC) validation, CRC computation, and other media access control sublayer operations.

The PCS 112 is configured to encode Ethernet frame data received from the MAC 116 into encoded data blocks that may be transmitted by the PMD/PMA 106, and to decode data received from the PMD/PMA 106 into decoded Ethernet frame data that may be processed by the MAC 116. The PCS 112 may encode and distribute the data blocks over one or more logical PCS lanes (PCSLs) 110. Each PCS lane 110 may operate at 5 Gb/s or at 10 Gb/s, similar to the PCS as specified by clause 82 of the IEEE 802.3 standard. The PCS 112 may encode data for transmission over the communication lanes 102 for example, to improve communication efficiency. For example, encoding the data may add timing or synchronization symbols, align the data, add state transitions to the encoded data to improve clock recovery, adjust the DC balance of the data signal, or otherwise prepare the encoded data for serial transmission. The PCS 112 may be capable of encoding or decoding the data using a 64b/66b line code in which 64-bit blocks of data are encoded into 66-bit blocks of encoded data, and vice versa.

The PCS 112 is further configured to enter a low power idle state and implement a low power transmission state machine and/or a low power reception state machine. For transmission, the PCS 112 may enter the low-power idle state in response to a command received from the MAC 116 or other upper-layer client. In the low-power idle state, the PCS 112 may power down a transmission circuit or otherwise cause the Ethernet port logic 100 to enter a reduced-power state. Periodically, the PCS 112 may refresh the communication lane 102 by powering on the transmission circuit and transmitting a series of rapid alignment markers (RAMs) to the remote link partner. The RAMs include a counter value ranging from an initial value (e.g., 255) down to a final value (e.g., one). After transmitting the next-to-last RAM (e.g., the RAM having a counter value equal to two), the PCS 112 may determine whether the MAC 116 is still commanding the PCS 112 to enter the low-power idle state. If so, the PCS 112 remains in the low-power idle state and transmits RAMs with the initial value (e.g., 255). If the MAC 116 is no longer commanding the PCS 112 to enter the low-power idle state after transmitting the next-to-last RAM, the PCS 112 may transmit the last RAM (e.g., the RAM having a counter value equal to one) and may exit the low-power idle state. Thus, the transition out of the low-power idle state and the transmission of the last RAM may be synchronized.

For reception, the PCS 112 may monitor for low-power idle symbols (LI) received from the remote link partner. In response to receiving an LI symbol, the PCS 112 may start a guard timer for a relatively short time period (e.g., 500 ns). After expiration of the guard timer, the PCS 112 may determine whether the remote link partner continues to transmit the LI symbol. If not, the PCS 112 may continue in the active, full-power state. If the LI symbol is still received from the remote link partner, the PCS 112 may enter a sleep state or a reduced-power state.

The FEC 108 is configured to apply a forward error correction code to the data passed over the PCS lanes 110 between the PMD/PMA 106 and the PCS 112. In other words, the FEC 108 may encode data passed from the PCS 112 to the PMD/PMA 106 and decode data passed from the PMD/PMA 106 to the PCS 112. The forward error correction code may improve the reliability of data transmission at higher line speeds. In some embodiments, the Ethernet port logic 100 may not include an FEC 108 and/or the FEC 108 may be optional. In embodiments that do not include the FEC 108, the PCS 112 may be coupled directly to the PMD/PMA 106.

The PMD/PMA 106 is configured to transmit and receive serial binary data over the communication lanes 102. The PMD/PMA 106 may also multiplex data from multiple PCS lanes 110 onto a single communication lane 102, and demultiplex data from each communication lane 102 onto multiple PCS lanes 110. For example, the PMD/PMA 106 may multiplex two PCS lanes 110 at 5 Gb/s each onto a single communication lane 102 at 10 Gb/s. In some embodiments, the PMD/PMA 106 may not multiplex multiple PCS lanes 110 onto a single communication lane 102. The PMD/PMA 106 may be embodied as, for example, a serializer/deserializer (SERDES) that converts serial data to parallel data. The SERDES may convert the serial data using, for example, a shift register.

Figure 2:
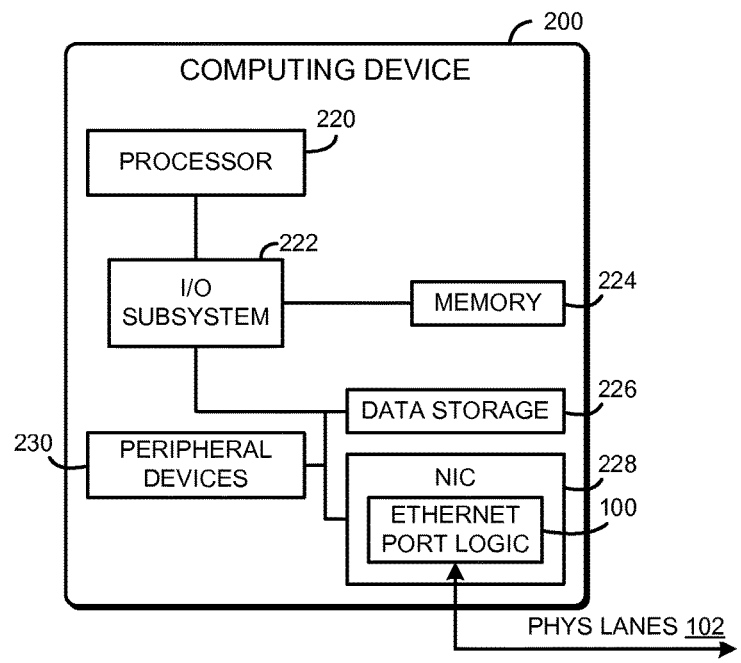
FIG. 2 is a simplified block diagram of at least one embodiment of a computing device that may include the Ethernet port logic of FIG. 1.

Referring now to FIG. 2, in an illustrative embodiment, a computing device 200 may include the Ethernet port logic 100. The computing device 200 may be embodied as any type of computation or computer device capable of performing the functions described herein, including, without limitation, a computer, a smartphone, a tablet computer, a laptop computer, a notebook computer, a mobile computing device, a wearable computing device, a multiprocessor system, a server, a rack-mounted server, a blade server, a network appliance, a web appliance, a distributed computing system, a processor-based system, and/or a consumer electronic device. As shown in FIG. 1, the computing device 200 illustratively includes a processor 220, an input/output subsystem 222, a memory 224, a data storage device 226, and a network interface controller (NIC) 228. Of course, the computing device 200 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 224, or portions thereof, may be incorporated in the processor 220 in some embodiments.

The processor 220 may be embodied as any type of processor capable of performing the functions described herein. For example, the processor 220 may be embodied as a single or multi-core processor(s), digital signal processor, microcontroller, or other processor or processing/controlling circuit. Similarly, the memory 224 may be embodied as any type of volatile or non-volatile memory or data storage capable of performing the functions described herein. In operation, the memory 224 may store various data and software used during operation of the computing device 200 such as operating systems, applications, programs, libraries, and drivers. The memory 224 is communicatively coupled to the processor 220 via the I/O subsystem 222, which may be embodied as circuitry and/or components to facilitate input/output operations with the processor 220, the memory 224, and other components of the computing device 200. For example, the I/O subsystem 222 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 222 may form a portion of a system-on-a-chip (SoC) and be incorporated, along with the processor 220, the memory 224, and other components of the computing device 200, on a single integrated circuit chip. The data storage device 226 may be embodied as any type of device or devices configured for short-term or long-term storage of data such as, for example, memory devices and circuits, memory cards, hard disk drives, solid-state drives, or other data storage devices.

The NIC 228 may connect the computing device 200 to one or more computing devices, network devices, switches, remote hosts, or other devices. The NIC 228 may be embodied as one or more add-in-boards, daughtercards, controller chips, chipsets, or other devices that may be used by the computing device 200 for network communications with remote devices. For example, the NIC 228 may be embodied as an expansion card coupled to the I/O subsystem 222 over an expansion bus such as PCI Express. In the illustrative embodiment, the NIC 228 includes a single Ethernet port logic 100 to connect to the remote devices. Of course, in other embodiments the computing device 200 may include additional Ethernet port logics 100 to support a different number of communication lanes 102.

In some embodiments, the computing device 200 may also include one or more peripheral devices 230. The peripheral devices 230 may include any number of additional input/output devices, interface devices, and/or other peripheral devices. For example, in some embodiments, the peripheral devices 230 may include a display, touch screen, graphics circuitry, keyboard, mouse, speaker system, network interface, and/or other input/output devices, interface devices, and/or peripheral devices.

Figure 3A:
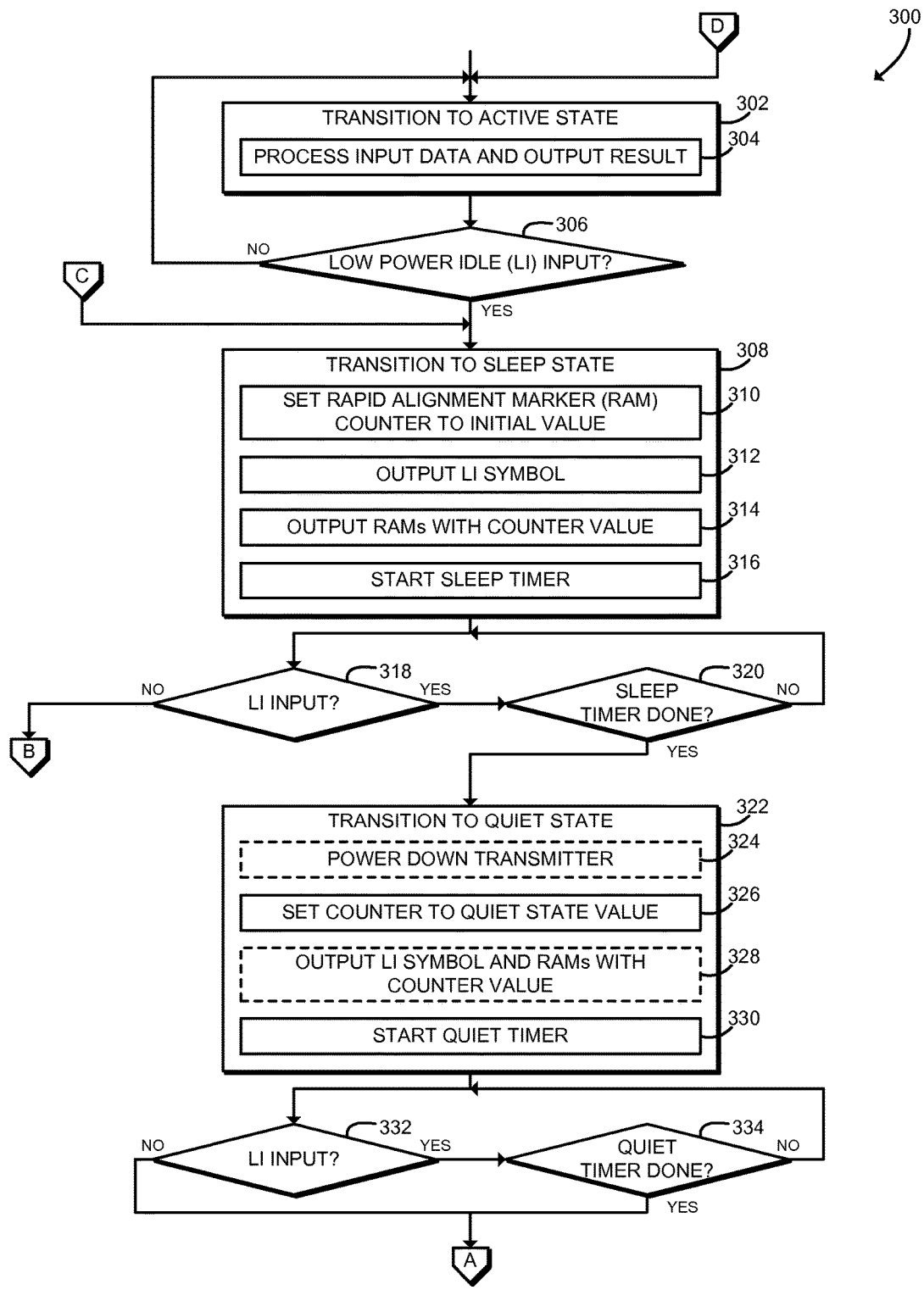
FIGS. 3A and 3B are a simplified flow diagram of at least one embodiment of a method for transmitting data that may be executed by the Ethernet port logic of FIG. 1.

Referring now to FIG. 3A, in use, the Ethernet port logic 100 may execute a method 300 for data transmission. The method 300 may be executed by one or more components of the Ethernet port logic 100; in the illustrative embodiment, the method 300 is executed by the PCS 112. The method 300 begins in block 302, in which the PCS 112 transitions to the active state. The PCS 112 may be embodied as or otherwise implement state machine logic. In each state, the PCS 112 may continually output certain data values and/or control symbols to other layers of the Ethernet port logic 100 (such as the MAC 116, the PMD/PMA 106, or the FEC 108). The PCS 112 may remain in a particular state until a certain input is received or some other condition has been satisfied. In block 304, the PCS 112 processes input data and outputs the resulting data to the physical lanes 102. For example, the PCS 112 may encode data received from the MAC 116 and forward that data to the PMD/PMA 106 and/or the FEC 108 for transmission. In block 306, the PCS 112 determines whether a low power idle control symbol (LI) has been received from the MAC 116. The LI symbol may be embodied as a predefined control character such as 0x06, a vector of predefined control characters, or other predetermined binary value. The MAC 116 may provide the LI symbol, for example, when there is no data currently available for transmission. If the LI symbol was not received, the method 300 loops back to block 302 to continue in the active state. If the LI symbol was received, the method 300 advances to block 308.

In block 308, the PCS 112 transitions to the sleep state. In block 310, the PCS 112 sets a rapid alignment marker (RAM) counter to its initial value, for example 255. In the illustrative embodiment, the RAM counter is implemented as a down-counter; that is, the RAM counter ranges from an initial value of 255 down to a final value of one. In block 312, the PCS 112 outputs a bit sequence corresponding to the LI symbol to the remote link partner via the communication lane 102 (for example by submitting the LI symbol to the PMD/PMA 106 and/or the FEC 108). As described further below in connection with FIGS. 5A and 5B, the remote link partner may transition to a sleep state in response to receiving the LI symbol. In block 314, the PCS 112 outputs RAMs to the remote link partner via the communication lane 102. Each RAM may be embodied as a specially formatted block of data, such as a 66-bit block of data. Each RAM is indicative of a value representing the current value of the RAM counter. For example, each RAM may include the current RAM counter value XOR'd with a constant value. The RAMs may be interleaved with regular data blocks transferred via the communication lane 102 (e.g., blocks including the LI symbol). For example, a RAM may be inserted after every seven data blocks on each PCS lane 110 for 100-gigabit connections or after every fifteen data blocks on each PCS lane 110 for 40-gigabit connections. In block 316, the PCS 112 starts a sleep timer. The sleep timer may expire in a predetermined amount of time, for example between 0.9 and 1.1 microseconds.

In block 318, the PCS 112 determines whether the LI symbol or any other symbol has been received from the MAC 116. If a symbol other than the LI symbol has been received, the method 300 branches ahead to block 346, shown in FIG. 3B, to transition to the wake state. If the LI symbol was received, the method 300 advances to block 320. In block 320, the PCS 112 determines whether the sleep timer has expired. If not, the method 300 loops back to block 318 to continue in the sleep state. If the sleep timer has expired, the method 300 advances to block 322.

In block 322, the PCS 112 transitions to a quiet state. In some embodiments, in block 324, the PCS 112 may power down a transmitter circuit or otherwise cause the Ethernet port logic 100 to enter a low-power state. In block 326, the PCS 112 sets the RAM counter to a quiet state value. For example, in the illustrative embodiment the PCS 112 sets the RAM counter to 242. In some embodiments, in block 328 the PCS 112 may output the LI symbol and RAMs including the RAM counter value to the remote link partner via the communication lane 102. For example, the PCS 112 may transmit that data if the transmitter remains in a normal power state. In block 330, the PCS 112 starts a quiet timer. The quiet timer may expire in a predetermined amount of time, for example between 1.7 and 1.8 milliseconds.

In block 332, the PCS 112 determines whether the LI symbol or any other symbol has been received from the MAC 116. If a symbol other than the LI symbol has been received, the method 300 branches ahead to block 336, shown in FIG. 3B, to transition to an alert state. If the LI symbol has been received, the method 300 advances to block 334. In block 334, the PCS 112 determines whether the quiet timer has expired. If not, the method 300 loops back to block 332 to continue in the quiet state. If the quiet timer has expired, the method 300 advances to block 336, shown in FIG. 3B.

Figure 3B:
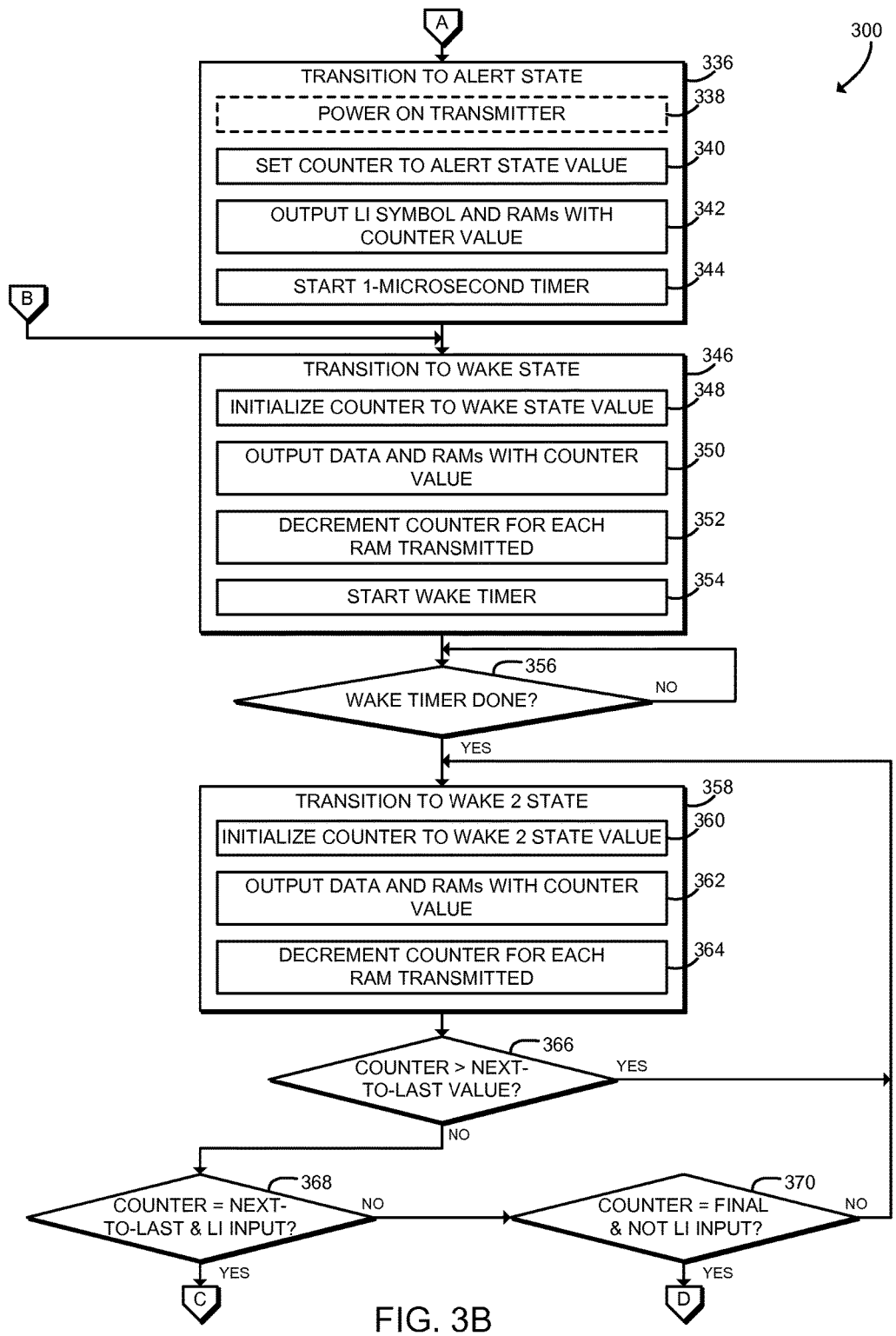

Referring now to FIG. 3B, in block 336, the PCS 112 transitions to the alert state. In some embodiments, in block 338 the PCS 112 may power on a transmitter circuit or otherwise cause the Ethernet port logic 100 to enter a normal- or full-power state. In block 340, the PCS 112 sets the RAM counter to an alert state value. For example, in the illustrative embodiment the PCS 112 sets the RAM counter to 213. In block 342, the PCS 112 outputs a bit sequence corresponding to the LI symbol and RAMs including the RAM counter value to the remote link partner via the communication lane 102. In block 344, the PCS 112 starts a one-microsecond timer. The one-microsecond timer may expire in approximately one microsecond, for example between 1.15 and 1.3 microseconds. After expiration of the one-microsecond timer, the method 300 advances to block 346.

In block 346, the PCS 112 transitions to the wake state. In block 348, the PCS 112 initializes the RAM counter to a wake state value. For example, in the illustrative embodiment the PCS 112 initializes the RAM counter to 36. In some embodiments, the PCS 112 may initialize the RAM counter to a different value, for example if scrambler bypass is enabled. In block 350, the PCS 112 outputs a bit sequence corresponding to data received from the MAC 116 interleaved with RAMs to the remote link partner via the communication lane 102. Each RAM is indicative of the current value of the RAM counter. In block 352, the PCS 112 decrements the RAM counter after each RAM transmitted to the remote link partner. In block 354, the PCS 112 starts a wake timer. The wake timer may expire in a predetermined amount of time, for example between 1.5 and 1.6 microseconds. In block 356, the PCS 112 determines whether the wake timer has expired. If not, the method 300 loops back to block 356 to continue in the wake state. If the wake timer has expired, the method 300 advances to block 358.

In block 358, the PCS 112 transitions to a second wake state, known as the wake 2 state. In block 360, the PCS 112 initializes the RAM counter to a wake 2 state value. For example, in the illustrative embodiment the PCS 112 initializes the RAM counter to 22. In block 362, the PCS 112 outputs a bit sequence corresponding to data received from the MAC 116 interleaved with RAMs to the remote link partner via the communication lane 102. Each RAM is indicative of the current value of the RAM counter. In block 364, the PCS 112 decrements the RAM counter after each RAM transmitted to the remote link partner.

In block 366, the PCS 112 determines whether the RAM counter is greater than the next-to-last value of the counter. For example, in the illustrative embodiment, the PCS 112 determines whether the RAM counter is greater than 2. If the counter is greater than the next-to-last value, the method 300 loops back to block 358 to continue in the wake 2 state. If the counter value is not greater than the next-to-last value, the method 300 advances to block 368. In other words, the PCS 112 transmits RAMs and decrements the counter until the next-to-last RAM (e.g., having the counter value 2) has been transmitted. In block 368, the PCS 112 determines whether the RAM counter equals the next-to-last value and if the LI symbol has been received from the MAC 116. In other words, the PCS 112 determines whether the next-to-last RAM (e.g., having the counter value 2) has been transmitted and if the low-power-idle symbol is still received from the MAC 116. If that condition is true, the method 300 loops back to block 308, shown in FIG. 3A, to continue in the sleep state without transmitting the last RAM (e.g., without transmitting a RAM having the counter value 1). As described above, when in the sleep state, the RAM counter is reset to the initial value (e.g., 255). Referring back to block 368, if the condition is false, the method 300 advances to block 370. In block 370, the PCS 112 determines whether the RAM counter equals the final counter value and if the LI symbol is not being received from the MAC 116. In other words, the PCS 112 determines whether the last RAM (e.g., having the counter value 1) has been transmitted and if any symbol other than the low-power idle symbol is received from the MAC 116. If that condition is true, the method 300 loops back to block 302, shown in FIG. 3A, to continue in the active state. If that condition is false, the method 300 loops back to block 358 to continue in the wake 2 state. Although illustrated as testing whether the RAM counter equals the final counter value and if the LI symbol is not being received from the MAC 116, it should be understood that in block 370 the LI symbol may always not be received (i.e., based on the result of the test of block 368), and thus the test for receiving the LI symbol may be removed as redundant.

Figure 4:
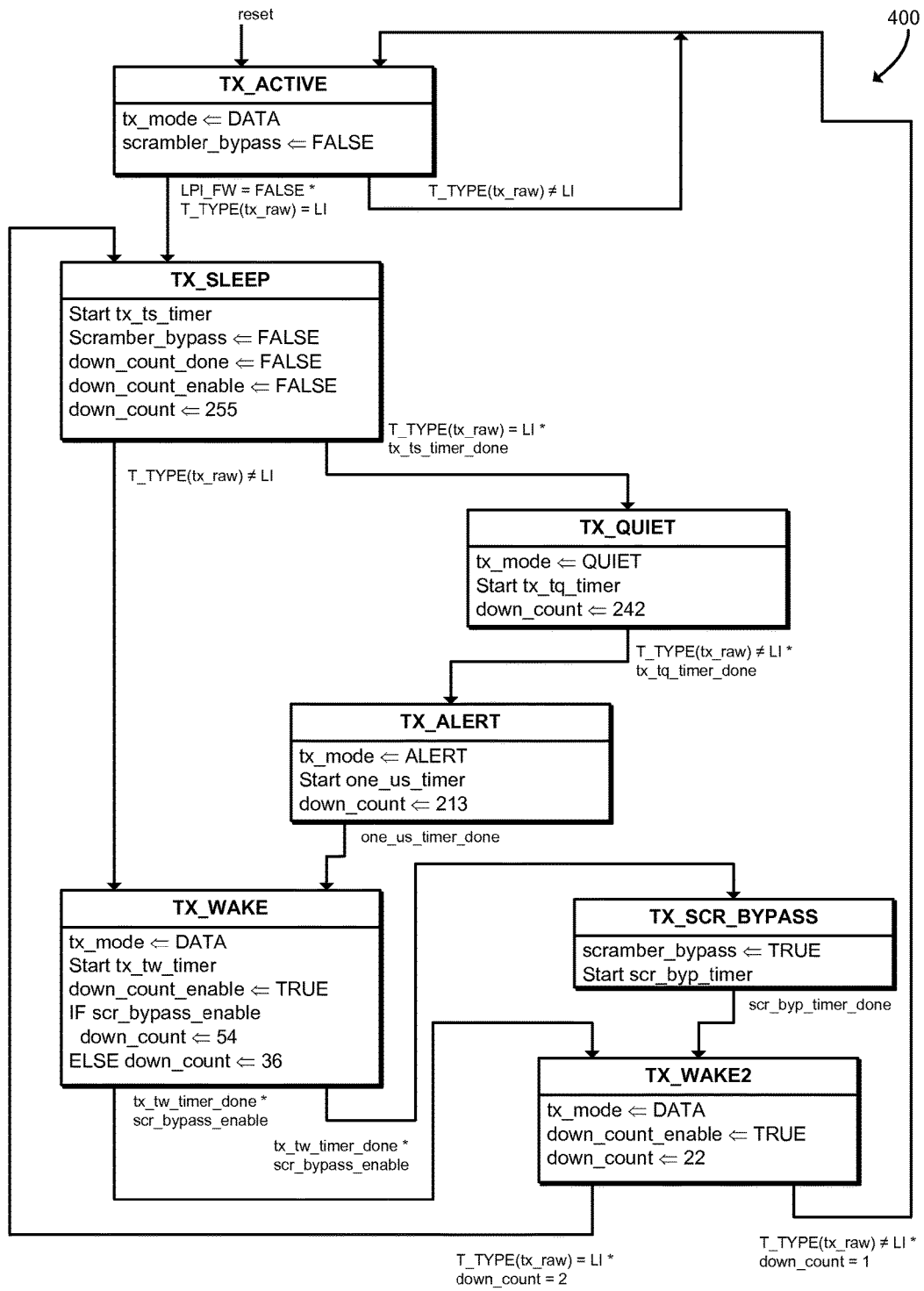
FIG. 4 is a state transition diagram for a low power idle transmitter that may be executed by the Ethernet port logic of FIG. 1.

Referring now to FIG. 4, the state transition diagram 400 illustrates state transitions that may be performed by the PCS 112 during low-power idle transmission in an illustrative embodiment. The state transition diagram 400 may illustrate one or more embodiments of the method 300 described in connection with FIGS. 3A and 3B. The state transition diagram 400 uses notation similar to the state transition diagrams of the IEEE standard 802.3bj-2014. Each block of the state diagram 400 represents a state. The various states are mutually exclusive; that is, only one state may be active at any given time. Each state includes a label (e.g., TX_ACTIVE, TX_SLEEP, etc.) and may include one or more signals generated or other actions taken when the state is entered. Transitions between the states are illustrated by arrows with labeled conditions. State transitions occur instantaneously when the conditions are met; when no conditions are met, the current state remains active and may generate output signals continuously. The label "UCT" identifies an unconditional transition.

For example, as shown in the state transition diagram 400, in the state TX_WAKE2, the variable tx_mode is set to DATA, the variable down_count_enable is set to TRUE, and the variable down_count is set to 22. Thus, in the TX_WAKE2 state, the transmission mode of the PCS 112 is set to DATA, which may cause the PCS 112 to encode and transmit data received from the MAC 116 (e.g., the idle symbol (I) or the low-power idle symbol (LI)) to the remote link partner via the communication lane 102. Similarly, in the TX_WAKE2 state, the RAM timer down_count is initially set to 22, and the down_count counter is enabled, causing the counter value to decrement after each RAM is transmitted.

As further illustrated in the state transition diagram 400, the state TX_WAKE2 may transition to either the TX_SLEEP state or the TX_ACTIVE state. The TX_WAKE2 state transitions to the TX_SLEEP state if T_TYPE(tx_raw)=LI and down_count=2; that is, if the raw data input from the MAC 116 equals the low-power idle symbol and the RAM counter equals two (i.e., after transmission of the next-to-last RAM). The TX_WAKE2 state transitions to the TX_ACTIVE state if T_TYPE(tx_raw)≠LI and down_count=1; that is, if the raw input data from the MAC 116 does not equal the low-power idle symbol and the RAM counter equals one (i.e., after transmission of the last RAM). Otherwise (e.g., if the RAM counter is greater than 2 or if the RAM counter equals 2 and the raw input from the MAC 116 does not equal the low-power idle symbol), the TX_WAKE2 state remains active. As described above, in some embodiments the TX_WAKE2 state may transition to the TX_ACTIVE state if down_count=1, without testing if T_TYPE(tx_raw)≠LI.

Figure 5A:
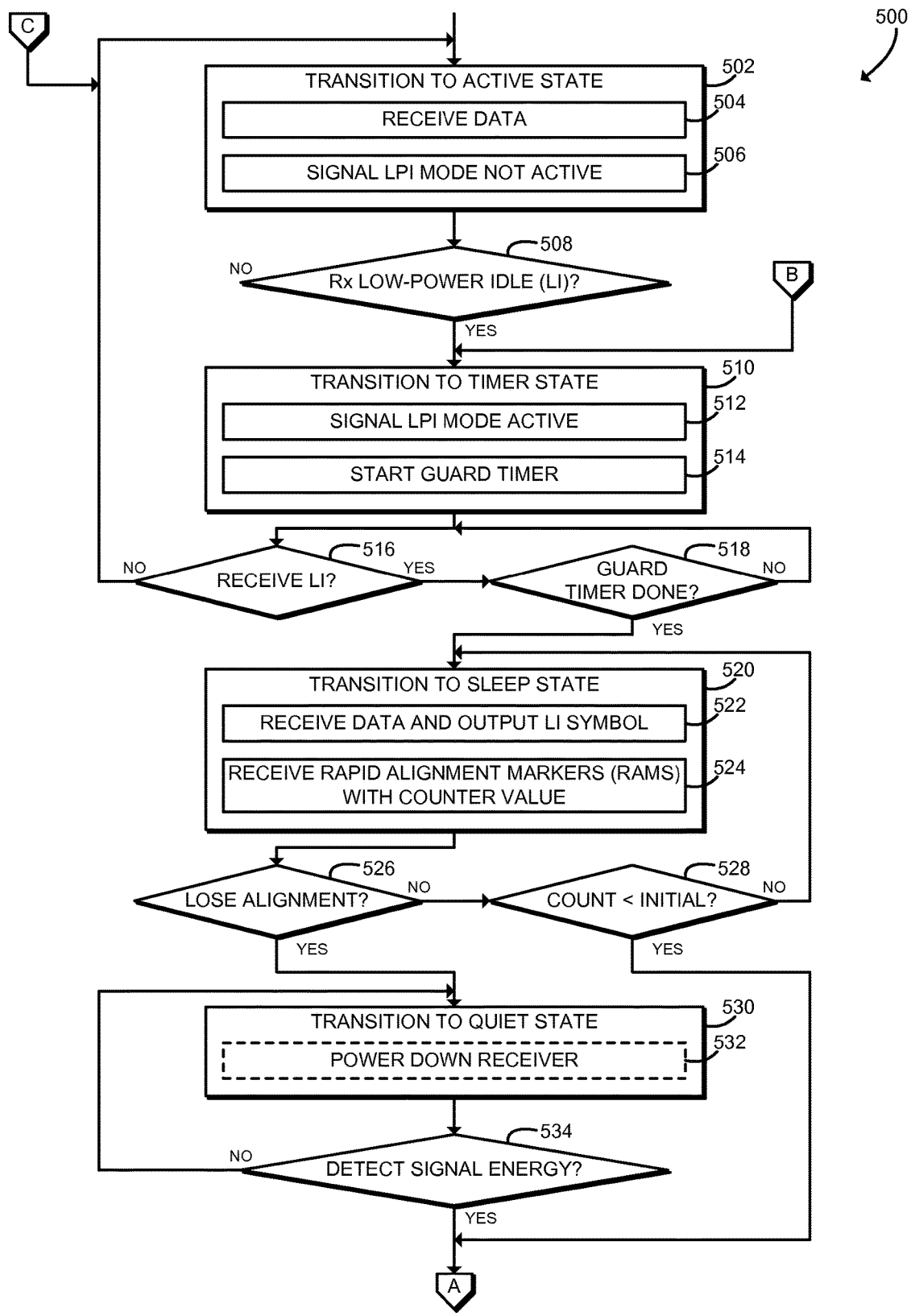
FIGS. 5A and 5B are a simplified flow diagram of at least one embodiment of a method for receiving data that may be executed by the Ethernet port logic of FIG. 1.

Referring now to FIG. 5A, in use, the Ethernet port logic 100 may execute a method 500 for data reception. The method 500 may be executed by one or more components of the Ethernet port logic 100; in the illustrative embodiment, the method 500 is executed by the PCS 112. The method 500 illustrates reception of data using a deep sleep mode. Reception of data using a fast wake mode (i.e., without deep sleep) and several potential error conditions are omitted from the method 500 for clarity of the current disclosure. The method 500 begins in block 502, in which the PCS 112 transitions to the active state. The PCS 112 may be embodied as or otherwise implement state machine logic. In each state, the PCS 112 may continually output certain data values and/or control symbols to other layers of the Ethernet port logic 100 (such as the MAC 116, the PMD/PMA 106, or the FEC 108). The PCS 112 may remain in a particular state until a certain input is received or some other condition has been satisfied. In block 504, the PCS 112 receives data from the remote link partner via the communication lane 102. The PCS 112 processes the received data and forwards it to its upper-layer client. For example, the PCS 112 may decode data received from the PMD/PMA 106 and/or the FEC 108 and forward the decoded data to the MAC 116. In block 506, the PCS 112 sets a signal indicating that the low-power idle (LPI) mode is not active. For example, the PCS 112 may signal one or more client layers such as the FEC 108, the PMD/PMA 106, or the MAC 116 that the LPI mode is not active. In block 508, the PCS 112 determines whether a bit sequence corresponding to a low power idle control symbol (LI) has been received from the remote link partner via the communication lane 102. As described above, the LI symbol may be embodied as a predefined control character such as 0x06, a vector of predefined control characters, or other predetermined binary value. As described above, the remote link partner may transmit the bit sequence corresponding to the LI symbol when it has entered the transmitter sleep state. If a symbol other than the LI symbol has not been received, the method 500 loops back to block 502 to continue in the active state. If the LI symbol has been received, the method 500 advances to block 510.

In block 510, the PCS 112 transitions to a timer state. In block 512, the PCS 112 sets a signal that the LPI mode is active. The PCS 112 may signal one or more client layers such as the FEC 108, the PMD/PMA 106, or the MAC 116 that the LPI mode is active. Additionally or alternatively, the PCS 112 may continually output the LI symbol to the MAC 116 when the LPI mode is active. In block 514, the PCS 112 starts a guard timer. The guard timer may have any duration greater than the potential amount of time after the last rapid alignment marker (RAM) is transmitted by the remote link partner and before the time that the remote link partner transitions out of the wake 2 state. For example, according to the IEEE standard 802.3bj-2014, the remote link partner transmits 22 RAMs during the wake 2 state. The RAM cycle time is 102.4 nanoseconds; therefore, transmitting 22 RAMs requires 2.2528 microseconds. The IEEE standard 802.3bj-2014 specifies that the transmitter transitions out of the TX_WAKE2 state after expiration of the tx_tw2_timer, which has a duration defined to be between 2.4 microseconds and 2.5 microseconds. Thus, a transmitter implementing the IEEE standard 802.3bj-2014 may remain in the TX_WAKE2 state for between 147 and 247 nanoseconds after transmitting the last RAM. Therefore, the guard timer set by the PCS 112 may have a duration of at least 147 to 247 nanoseconds; in the illustrative embodiment, the guard timer has a duration of 500 nanoseconds. The guard timer ensures that the PCS 112 transitions out of the timer state only after the remote link partner has transitioned out of the TX_WAKE2 state.

In block 516, the PCS 112 determines whether it has received the low-power idle (LI) symbol from the remote link partner via the communication lane 102. In certain circumstance, the remote link partner may transition quickly back to the active state after sending the LI symbol. For example, a transmitter implementing the IEEE standard 802.3bj-2014 may exit out of the low-power idle state during the small amount of time (e.g., 147 to 247 nanoseconds) after transmitting the last RAM but before exiting the TX_WAKE2 state. In that circumstance, the transmitter may initially transmit the LI symbol but switch to transmitting an ordinary idle symbol (I) prior to transitioning out of the TX_WAKE2 state. If the PCS 112 has received a symbol other than the LI symbol (e.g., the I symbol or another control or data symbol), the method 500 loops back to block 502 to transition to the active state. If the LI symbol was received, the method 500 advances to block 518. In block 518, the PCS 112 determines whether the guard timer has expired. If not, the method 500 loops back to block 516 to continue in the timer state. If the guard timer has expired, the method 500 advances to block 520.

In block 520, the PCS 112 transitions to a sleep state. In block 522, the PCS 112 receives data from the remote link partner via the communication lane 102. The remote link partner may continually transmit the LI symbol. Regardless of the data received from the remote link partner, the PCS 112 may continually output the LI symbol to the MAC 116. In block 524, the PCS 112 receives rapid alignment markers (RAMs) from the remote link partner via the communication lane 102. As described above, each RAM may be embodied as a specially formatted block of data, such as a 66-bit block of data. Each RAM is indicative of a value representing the current value of a RAM counter maintained by the remote link partner. For example, each RAM may include the current RAM counter value XOR'd with a constant value. The RAMs may be interleaved with regular data blocks received via the communication lane 102 (e.g., blocks including the LI symbol).

In block 526, the PCS 112 determines whether the data received via the communication lane 102 is aligned. The PCS 112 may determine whether all logical PCS lanes 110 have been successfully aligned and de-skewed. If the data is not aligned, indicating that no valid signal is received and thus that the remote transmitter may have been powered off, the method 500 branches to block 530 to transition to a quiet state, described below. If the data remains aligned, the method 500 advances to block 528, in which the PCS 112 determines whether the count value of the RAM received from the remote link partner is less than the initial counter value. For example, in the illustrative embodiment the PCS 112 determines whether the count value of the RAM is less than 255. If not (e.g., if the count value equals 255), the method 500 loops back to block 520 to continue in the sleep state. If the count value is less than the initial counter value, the method 500 branches to block 536, shown in FIG. 5B and further described below.

Referring back to block 526, if data alignment is lost, the method 500 branches to block 530, in which the PCS 112 transitions to the quiet state. In the quiet state, the remote link partner may have powered down its transmitter or otherwise ceased transmitting data via the communication lane 102. In some embodiments, in block 532, the PCS 112 may power down a receiver circuit or otherwise cause the Ethernet port logic 100 to enter a reduced-power state. However, even in the quiet state, the PCS 112 continually outputs the LI symbol to the MAC 116. In block 534, the PCS 112 determines whether signal energy has been detected from the remote link partner via the communication lane 102. If not, the method 500 loops back to block 530 to continue in the quiet state. If signal energy has been detected, the method 500 advances to block 536, shown in FIG. 5B.

Figure 5B:
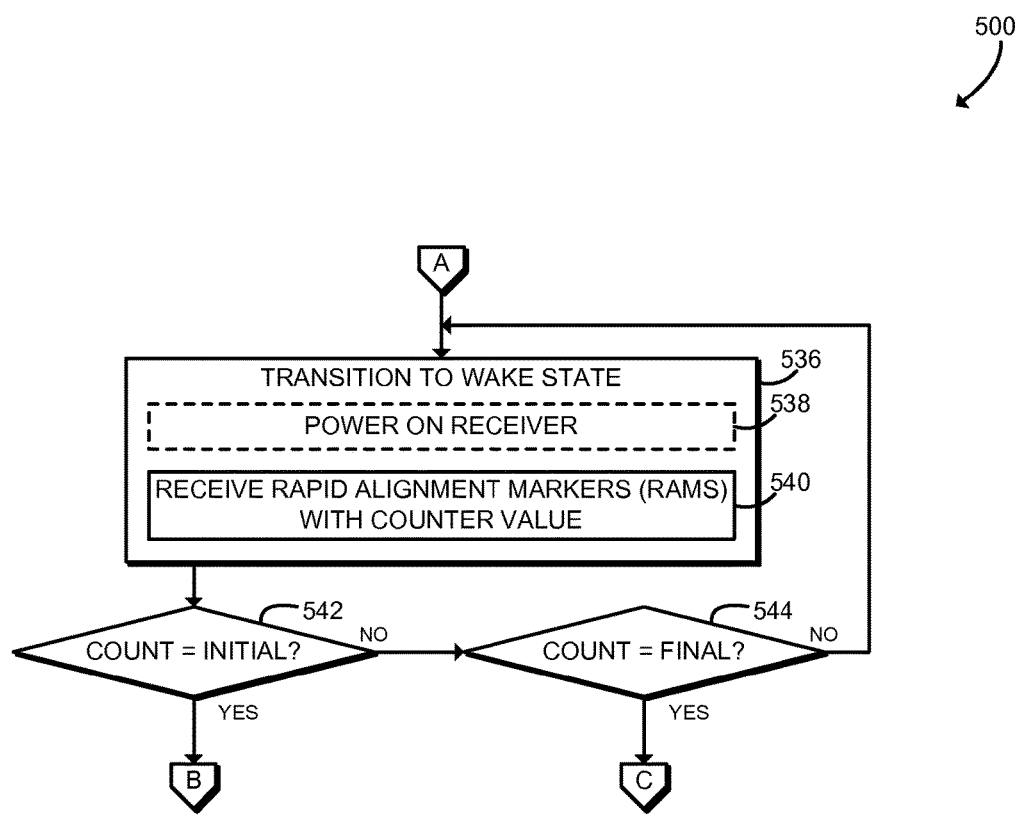

Referring now to FIG. 5B, in block 536 the PCS 112 transitions to a wake state. In some embodiments, in block 538 the PCS 112 may power on a receiver circuit or otherwise cause the Ethernet port logic 100 to enter a full-power state. In block 540, the PCS 112 receives RAMs from the remote link partner via the communication lane 102. As described above, each RAM is indicative of a counter value provided by the remote link partner.

In block 542, the PCS 112 determines whether the counter value equals the initial counter value. For example, in the illustrative embodiment the PCS 112 determines whether the counter value equals 255. If the counter value equals the initial counter value, the method 500 loops back to block 510, shown in FIG. 5A, to transition to the timer state (and then potentially to the sleep state, as described above). If the counter value does not equal the initial counter value, the method 500 advances to block 544. In block 544, the PCS 112 determines whether the counter value equals the final counter value. For example, in the illustrative embodiment the PCS 112 determines whether the counter value equals 1. As described above, if the counter value equals the final counter value, then the last RAM has been transmitted. If the counter value does not equal the final counter value, the method 500 loops back to block 536 to continue checking RAM counter values in the wake state. If the counter value equals the final counter value, the method 500 loops back to block 502, shown in FIG. 5A, to transition to the active state. As described above, in the active state, the PCS 112 may monitor data received from the remote link partner for the LI symbol and may either continue in the active state or transition to the timer state and then potentially to the sleep state, accordingly.

Figure 6:
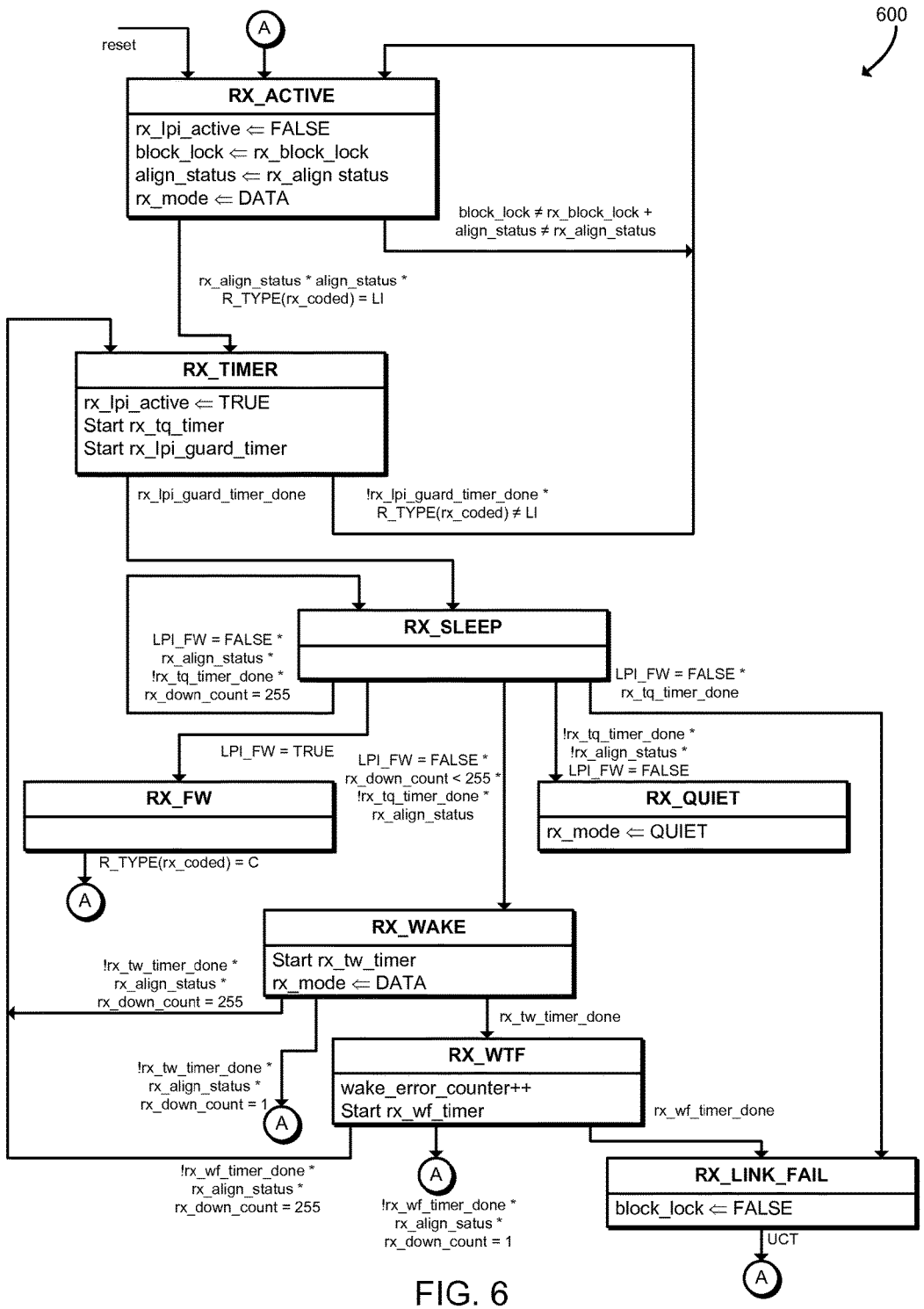
FIG. 6 is a state transition diagram for a low power idle receiver that may be executed by the Ethernet port logic of FIG. 1.

Referring now to FIG. 6, the state transition diagram 600 illustrates state transitions that may be performed by the PCS 112 during low-power idle data reception in an illustrative embodiment. The state transition diagram 600 may illustrate one or more embodiments of the method 500 described in connection with FIGS. 5A and 5B. The state transition diagram 600 uses notation similar to the state transition diagrams of the IEEE standard 802.3bj-2014. Each block of the state diagram 600 represents a state. The various states are mutually exclusive; that is, only one state may be active at any given time. Each state includes a label (e.g., RX_ACTIVE, RX_TIMER, etc.) and may include one or more signals generated or other actions taken when the state is entered. Transitions between the states are illustrated by arrows with labeled conditions. State transitions occur instantaneously when the conditions are met; when no conditions are met, the current state remains active and may generate output signals continuously. The label "UCT" identifies an unconditional transition.

For example, as shown in the state transition diagram 600, in the state RX_TIMER, the variable rx_lpi_active is set to TRUE, the rx_tq_timer timer is started, and the rx_lpi_guard_timer timer is started. Thus, in the RX_TIMER state, the LPI active signal is asserted, which may allow components of the Ethernet port logic 100 to enter a reduced-power state.

As further illustrated in the state transition diagram 600, the state RX_TIMER may transition to either the RX_SLEEP state or the RX_ACTIVE state. The RX_TIMER state transitions to the RX_ACTIVE state if !rx_lpi_guard_timer_done and R_TYPE(rx_coded)≠LI; that is, if the guard timer has not expired and the coded data received from the remote link partner via the communication lane 102 does not equal the low-power idle symbol. The RX_TIMER state transitions to the RX_SLEEP state if rx_lpi_guard_timer_done; that is, if the guard timer has expired. Otherwise (e.g., if the guard timer has not expired and the coded data received from the remote link partner via the communication lane 102 equals the low-power idle symbol), the RX_TIMER state remains active.

EXAMPLES

Illustrative examples of the technologies disclosed herein are provided below. An embodiment of the technologies may include any one or more, and any combination of, the examples described below.

Example 1 includes a network port logic for low-power data communication, the network port logic comprising a physical coding sublayer (PCS) logic to transmit, during a wake state, a plurality of rapid alignment markers to a remote link partner via a physical link, wherein each rapid alignment marker is indicative of a corresponding counter value that is selected from a sequence of values including a first counter value, a last counter value, and a next-to-last counter value; determine, during the wake state, whether the counter value of a first rapid alignment marker of the plurality of rapid alignment markers equals the next-to-last counter value and whether a low power idle command is set in response to transmission of the first rapid alignment marker; and transition from the wake state to a sleep state in response to a determination that the counter value of the first rapid alignment marker equals the next-to-last counter value and the low power idle command is set.

Example 2 includes the subject matter of Example 1, and wherein the PCS logic is further to determine, during the wake state, whether the counter value of the first rapid alignment marker equals the last counter value in response to transmission of the first rapid alignment marker; and transition from the wake state to an active state in response to a determination that the counter value of the first rapid alignment marker equals the last counter value.

Example 3 includes the subject matter of any of Examples 1 and 2, and wherein the next-to-last counter value equals two and the last counter value equals one.

Example 4 includes the subject matter of any of Examples 1-3, and wherein the counter value of each rapid alignment marker is indicative of a first counter of the network port logic; and the PCS logic is further to decrement, during the wake state, the first counter in response to transmission of the first rapid alignment marker.

Example 5 includes the subject matter of any of Examples 1-4, and wherein the PCS logic is further to transmit, during the sleep state, a rapid alignment marker that is indicative of a counter value equal to the first counter value in response to a transition from the wake state to the sleep state.

Example 6 includes the subject matter of any of Examples 1-5, and wherein the first counter value equals 255.

Example 7 includes the subject matter of any of Examples 1-6, and wherein the PCS logic is further to transition from the sleep state to the wake state; wherein to transmit the plurality of rapid alignment markers comprises to transmit the plurality of rapid alignment markers in response to a transition from the sleep state to the wake state.

Example 8 includes the subject matter of any of Examples 1-7, and wherein to transition from the sleep state to the wake state comprises to transition from the sleep state to the wake state in response to expiration of a sleep timer.

Example 9 includes the subject matter of any of Examples 1-8, and wherein the PCS logic is further to transition from the sleep state to a quiet state in response to expiration of the sleep timer; and transition from the quiet state to the wake state in response to expiration of a quiet timer.

Example 10 includes the subject matter of any of Examples 1-9, and wherein the PCS logic is further to reduce power consumption of a transmitter circuit of the network port logic during the quiet state.

Example 11 includes the subject matter of any of Examples 1-10, and wherein the PCS logic is further to receive, in a receiver active state, first data from the remote link partner via the physical link; determine, in the receiver active state, whether the first data includes a low-power idle code; transition from the receiver active state to a receiver timer state in response to a determination that the first data includes the low-power idle code; start a guard timer in response to a transition to the receiver timer state; receive, in the receiver timer state, second data from the remote link partner via the physical link; determine, in the receiver timer state, whether the second data includes the low-power idle code; and transition from the receiver timer state to a receiver sleep state in response to expiration of the guard timer and a determination that the second data includes the low-power idle code.

Example 12 includes the subject matter of any of Examples 1-11, and wherein the PCS logic is further to transition from the receiver timer state to the receiver active state in response to a determination that the second data does not include the low-power idle code.

Example 13 includes the subject matter of any of Examples 1-12, and wherein the physical link comprises a 40-gigabit copper cable connection or a 40-gigabit backplane connection, and wherein the physical link comprises four physical lanes.

Example 14 includes the subject matter of any of Examples 1-13, and wherein the physical link comprises a 100-gigabit copper cable connection, and wherein the physical link comprises 4 physical lanes or 10 physical lanes.

Example 15 includes a network port logic for low-power data communication, the network port logic comprising a physical coding sublayer (PCS) logic to receive, in an active state, first data from a remote link partner via a physical link; determine, in the active state, whether the first data includes a low-power idle code; transition from the active state to a timer state in response to a determination that the first data includes the low-power idle code; start a guard timer in response to a transition to the timer state; receive, in the timer state, second data from the remote link partner via the physical link; determine, in the timer state, whether the second data includes the low-power idle code; and transition from the timer state to a sleep state in response to expiration of the guard timer and a determination that the second data includes the low-power idle code.

Example 16 includes the subject matter of Example 15, and wherein the guard timer specifies a delay of at least 147 nanoseconds.

Example 17 includes the subject matter of any of Examples 15 and 16, and wherein the guard timer specifies a delay of at least 247 nanoseconds.

Example 18 includes the subject matter of any of Examples 15-17, and wherein guard timer specifies a delay of at least 500 nanoseconds.

Example 19 includes the subject matter of any of Examples 15-18, and wherein the PCS logic is further to transition from the timer state to the active state in response to a determination that the second data does not include the low-power idle code.

Example 20 includes the subject matter of any of Examples 15-19, and wherein the PCS logic is further to receive, in the sleep state, a plurality of rapid alignment markers from the remote link partner via the physical link, wherein each rapid alignment marker is indicative of a corresponding counter value that is selected from a sequence of values including a first counter value, a last counter value, and a next-to-last counter value.

Example 21 includes the subject matter of any of Examples 15-20, and wherein the PCS logic is further to determine whether a first rapid alignment marker of the plurality of rapid alignment markers is not indicative of the first counter value; and transition from the sleep state to a wake state in response to a determination that the first rapid alignment marker is not indicative of the first counter value.

Example 22 includes the subject matter of any of Examples 15-21, and wherein the first counter value equals 255.

Example 23 includes the subject matter of any of Examples 15-22, and wherein the PCS logic is further to receive, in the wake state, a second plurality of rapid alignment markers from the remote link partner via the physical link, wherein each rapid alignment marker is indicative of a corresponding counter value that is selected from the sequence of values including the first counter value, the last counter value, and the next-to-last counter value; determine, in the wake state, whether a second rapid alignment marker of the second plurality of rapid alignment markers is indicative of the first counter value; and transition from the wake state to the sleep state in response to a determination that the second rapid alignment marker is indicative of the first counter value.

Example 24 includes the subject matter of any of Examples 15-23, and wherein the first counter value equals 255.

Example 25 includes the subject matter of any of Examples 15-24, and wherein the PCS logic is further to determine, in the wake state, whether the second rapid alignment marker is indicative of the last counter value; and transition from the wake state to the active state in response to a determination that the second rapid alignment marker is indicative of the last counter value.

Example 26 includes the subject matter of any of Examples 15-25, and wherein the last counter value equals one.

Example 27 includes the subject matter of any of Examples 15-26, and wherein the PCS logic is further to determine, in the sleep state, whether a lane synchronization status is false; and transition from the sleep state to a quiet state in response to a determination that the lane synchronization status is false.

Example 28 includes the subject matter of any of Examples 15-27, and wherein the PCS logic is further to detect, in the quiet state, signal energy from the remote link partner via the physical link; and transition from the quiet state to the wake state in response to detection of the signal energy.

Example 29 includes the subject matter of any of Examples 15-28, and wherein the PCS logic is further to transmit, during a transmitter wake state, a plurality of rapid alignment markers to the remote link partner via the physical link, wherein each rapid alignment marker is indicative of a corresponding counter value that is selected from a sequence of values including a first counter value, a last counter value, and a next-to-last counter value; determine, during the transmitter wake state, whether the counter value of a first rapid alignment marker of the plurality of rapid alignment markers equals the next-to-last counter value and whether a low power idle command is set in response to transmission of the first rapid alignment marker; and transition from the transmitter wake state to a transmitter sleep state in response to a determination that the counter value of the first rapid alignment marker equals the next-to-last counter value and the low power idle command is set.

Example 30 includes the subject matter of any of Examples 15-29, and wherein the PCS logic is further to determine, during the transmitter wake state, whether the counter value of the first rapid alignment marker equals the last counter value in response to transmission of the first rapid alignment marker; and transition from the transmitter wake state to a transmitter active state in response to a determination that the counter value of the first rapid alignment marker equals the last counter value.

Example 31 includes the subject matter of any of Examples 15-30, and wherein the physical link comprises a 40-gigabit copper cable connection or a 40-gigabit backplane connection, and wherein the physical link comprises four physical lanes.

Example 32 includes the subject matter of any of Examples 15-31, and wherein the physical link comprises a 100-gigabit copper cable connection, and wherein the physical link comprises 4 physical lanes or 10 physical lanes.

Example 33 includes a method for low-power data communication, the method comprising transmitting, by the network port logic during a wake state, a plurality of rapid alignment markers to a remote link partner via a physical link, wherein each rapid alignment marker is indicative of a corresponding counter value that is selected from a sequence of values including a first counter value, a last counter value, and a next-to-last counter value; determining, by the network port logic during the wake state, whether the counter value of a first rapid alignment marker of the plurality of rapid alignment markers equals the next-to-last counter value and whether a low power idle command is set in response to transmitting the first rapid alignment marker; and transitioning, by the network port logic, from the wake state to a sleep state in response to determining the counter value of the first rapid alignment marker equals the next-to-last counter value and the low power idle command is set.

Example 34 includes the subject matter of Example 33, and further including determining, by the network port logic during the wake state, whether the counter value of the first rapid alignment marker equals the last counter value in response to transmitting the first rapid alignment marker; and transitioning, by the network port logic, from the wake state to an active state in response to determining the counter value of the first rapid alignment marker equals the last counter value.

Example 35 includes the subject matter of any of Examples 33 and 34, and wherein the next-to-last counter value equals two and the last counter value equals one.

Example 36 includes the subject matter of any of Examples 33-35, and wherein the counter value of each rapid alignment marker is indicative of a first counter of the network port logic, the method further comprising decrementing, by the network port logic during the wake state, the first counter in response to transmitting the first rapid alignment marker.

Example 37 includes the subject matter of any of Examples 33-36, and further including transmitting, by the network port logic during the sleep state, a rapid alignment marker that is indicative of a counter value equal to the first counter value in response to transitioning from the wake state to the sleep state.

Example 38 includes the subject matter of any of Examples 33-37, and wherein the first counter value equals 255.

Example 39 includes the subject matter of any of Examples 33-38, and further including transitioning, by the network port logic, from the sleep state to the wake state, wherein transmitting the plurality of rapid alignment markers comprises transmitting the plurality of rapid alignment markers in response to transitioning from the sleep state to the wake state.

Example 40 includes the subject matter of any of Examples 33-39, and wherein transitioning from the sleep state to the wake state comprises transitioning from the sleep state to the wake state in response to expiration of a sleep timer.

Example 41 includes the subject matter of any of Examples 33-40, and further including transitioning, by the network port logic, from the sleep state to a quiet state in response to expiration of the sleep timer; and transitioning, by the network port logic, from the quiet state to the wake state in response to expiration of a quiet timer.

Example 42 includes the subject matter of any of Examples 33-41, and further including reducing power consumption, by the network port logic, of a transmitter circuit of the network port logic during the quiet state.

Example 43 includes the subject matter of any of Examples 33-42, and further including receiving, by the network port logic in a receiver active state, first data from the remote link partner via the physical link; determining, by the network port logic in the receiver active state, whether the first data includes a low-power idle code; transitioning, by the network port logic, from the receiver active state to a receiver timer state in response to determining the first data includes the low-power idle code; starting, by the network port logic, a guard timer in response to transitioning to the receiver timer state; receiving, by the network port logic in the receiver timer state, second data from the remote link partner via the physical link; determining, by the network port logic in the receiver timer state, whether the second data includes the low-power idle code; and transitioning, by the network port logic, from the receiver timer state to a receiver sleep state in response to expiration of the guard timer and determining that the second data includes the low-power idle code.

Example 44 includes the subject matter of any of Examples 33-43, and further including transitioning, by the network port logic, from the receiver timer state to the receiver active state in response to determining that the second data does not include the low-power idle code.

Example 45 includes the subject matter of any of Examples 33-44, and wherein the physical link comprises a 40-gigabit copper cable connection or a 40-gigabit backplane connection, and wherein the physical link comprises four physical lanes.

Example 46 includes the subject matter of any of Examples 33-45, and wherein the physical link comprises a 100-gigabit copper cable connection, and wherein the physical link comprises 4 physical lanes or 10 physical lanes.

Example 47 includes a method for low-power data communication, the method comprising receiving, by a network port logic in an active state, first data from a remote link partner via a physical link; determining, by the network port logic in the active state, whether the first data includes a low-power idle code; transitioning, by the network port logic, from the active state to a timer state in response to determining the first data includes the low-power idle code; starting, by the network port logic, a guard timer in response to transitioning to the timer state; receiving, by the network port logic in the timer state, second data from the remote link partner via the physical link; determining, by the network port logic in the timer state, whether the second data includes the low-power idle code; and transitioning, by the network port logic, from the timer state to a sleep state in response to expiration of the guard timer and determining that the second data includes the low-power idle code.

Example 48 includes the subject matter of Example 47, and wherein the guard timer specifies a delay of at least 147 nanoseconds.

Example 49 includes the subject matter of any of Examples 47 and 48, and wherein the guard timer specifies a delay of at least 247 nanoseconds.

Example 50 includes the subject matter of any of Examples 47-49, and wherein guard timer specifies a delay of at least 500 nanoseconds.

Example 51 includes the subject matter of any of Examples 47-50, and further including transitioning, by the network port logic, from the timer state to the active state in response to determining that the second data does not include the low-power idle code.

Example 52 includes the subject matter of any of Examples 47-51, and further including receiving, by the network port logic in the sleep state, a plurality of rapid alignment markers from the remote link partner via the physical link, wherein each rapid alignment marker is indicative of a corresponding counter value that is selected from a sequence of values including a first counter value, a last counter value, and a next-to-last counter value.

Example 53 includes the subject matter of any of Examples 47-52, and further including determining, by the network port logic, whether a first rapid alignment marker of the plurality of rapid alignment markers is not indicative of the first counter value; and transitioning, by the network port logic, from the sleep state to a wake state in response to determining the first rapid alignment marker is not indicative of the first counter value.

Example 54 includes the subject matter of any of Examples 47-53, and wherein determining whether the first rapid alignment marker is not indicative of the first counter value comprises determining whether the first rapid alignment marker is indicative of a counter value less than 255.

Example 55 includes the subject matter of any of Examples 47-54, and further including receiving, by the network port logic in the wake state, a second plurality of rapid alignment markers from the remote link partner via the physical link, wherein each rapid alignment marker is indicative of a corresponding counter value that is selected from the sequence of values including the first counter value, the last counter value, and the next-to-last counter value;

determining, by the network port logic in the wake state, whether a second rapid alignment marker of the second plurality of rapid alignment markers is indicative of the first counter value; and transitioning, by the network port logic, from the wake state to the sleep state in response to determining the second rapid alignment marker is indicative of the first counter value.

Example 56 includes the subject matter of any of Examples 47-55, and wherein determining whether the second rapid alignment marker is indicative of the first counter value comprises determining whether the second rapid alignment marker is indicative of a counter value equal to 255.

Example 57 includes the subject matter of any of Examples 47-56, and further including determining, by the network port logic in the wake state, whether the second rapid alignment marker is indicative of the last counter value; and transitioning, by the network port logic, from the wake state to the active state in response to determining the second rapid alignment marker is indicative of the last counter value.

Example 58 includes the subject matter of any of Examples 47-57, and wherein determining whether the second rapid alignment marker is indicative of the last counter value comprises determining whether the second rapid alignment marker is indicative of a counter value equal to one.

Example 59 includes the subject matter of any of Examples 47-58, and further including determining, by the network port logic in the sleep state, whether a lane synchronization status is false; and transitioning, by the network port logic, from the sleep state to a quiet state in response to determining the lane synchronization status is false.

Example 60 includes the subject matter of any of Examples 47-59, and further including detecting, by the network port logic in the quiet state, signal energy from the remote link partner via the physical link; and transitioning, by the network port logic, from the quiet state to the wake state in response to detecting the signal energy.

Example 61 includes the subject matter of any of Examples 47-60, and further including transmitting, by the network port logic during a transmitter wake state, a plurality of rapid alignment markers to the remote link partner via the physical link, wherein each rapid alignment marker is indicative of a corresponding counter value that is selected from a sequence of values including a first counter value, a last counter value, and a next-to-last counter value; determining, by the network port logic during the transmitter wake state, whether the counter value of a first rapid alignment marker of the plurality of rapid alignment markers equals the next-to-last counter value and whether a low power idle command is set in response to transmitting the first rapid alignment marker; and transitioning, by the network port logic, from the transmitter wake state to a transmitter sleep state in response to determining the counter value of the first rapid alignment marker equals the next-to-last counter value and the low power idle command is set.

Example 62 includes the subject matter of any of Examples 47-61, and further including determining, by the network port logic during the transmitter wake state, whether the counter value of the first rapid alignment marker equals the last counter value in response to transmitting the first rapid alignment marker; and transitioning, by the network port logic, from the transmitter wake state to a transmitter active state in response to determining the counter value of the first rapid alignment marker equals the last counter value.

Example 63 includes the subject matter of any of Examples 47-62, and wherein the physical link comprises a 40-gigabit copper cable connection or a 40-gigabit backplane connection, and wherein the physical link comprises four physical lanes.

Example 64 includes the subject matter of any of Examples 47-63, and wherein the physical link comprises a 100-gigabit copper cable connection, and wherein the physical link comprises 4 physical lanes or 10 physical lanes.

Example 65 includes a computing device comprising a processor; and a memory having stored therein a plurality of instructions that when executed by the processor cause the computing device to perform the method of any of Examples 33-64.

Example 66 includes one or more machine readable storage media comprising a plurality of instructions stored thereon that in response to being executed result in a computing device performing the method of any of Examples 33-64.

Example 67 includes a computing device comprising means for performing the method of any of Examples 33-64.

Example 68 includes a network port logic for low-power data communication, the network port logic comprising means for transmitting, during a wake state, a plurality of rapid alignment markers to a remote link partner via a physical link, wherein each rapid alignment marker is indicative of a corresponding counter value that is selected from a sequence of values including a first counter value, a last counter value, and a next-to-last counter value; means for determining, during the wake state, whether the counter value of a first rapid alignment marker of the plurality of rapid alignment markers equals the next-to-last counter value and whether a low power idle command is set in response to transmitting the first rapid alignment marker; and means for transitioning from the wake state to a sleep state in response to determining the counter value of the first rapid alignment marker equals the next-to-last counter value and the low power idle command is set.

Example 69 includes the subject matter of Example 68, and further including means for determining, during the wake state, whether the counter value of the first rapid alignment marker equals the last counter value in response to transmitting the first rapid alignment marker; and means for transitioning from the wake state to an active state in response to determining the counter value of the first rapid alignment marker equals the last counter value.

Example 70 includes the subject matter of any of Examples 68 and 69, and wherein the next-to-last counter value equals two and the last counter value equals one.

Example 71 includes the subject matter of any of Examples 68-70, and wherein the counter value of each rapid alignment marker is indicative of a first counter of the network port logic, the network port logic further comprising means for decrementing, during the wake state, the first counter in response to transmitting the first rapid alignment marker.

Example 72 includes the subject matter of any of Examples 68-71, and further including means for transmitting, during the sleep state, a rapid alignment marker that is indicative of a counter value equal to the first counter value in response to transitioning from the wake state to the sleep state.

Example 73 includes the subject matter of any of Examples 68-72, and wherein the first counter value equals 255.

Example 74 includes the subject matter of any of Examples 68-73, and further including means for transitioning from the sleep state to the wake state, wherein the means for transmitting the plurality of rapid alignment markers comprises means for transmitting the plurality of rapid alignment markers in response to transitioning from the sleep state to the wake state.

Example 75 includes the subject matter of any of Examples 68-74, and wherein the means for transitioning from the sleep state to the wake state comprises means for transitioning from the sleep state to the wake state in response to expiration of a sleep timer.

Example 76 includes the subject matter of any of Examples 68-75, and further including means for transitioning from the sleep state to a quiet state in response to expiration of the sleep timer; and means for transitioning from the quiet state to the wake state in response to expiration of a quiet timer.

Example 77 includes the subject matter of any of Examples 68-76, and further including means for reducing power consumption of a transmitter circuit of the network port logic during the quiet state.

Example 78 includes the subject matter of any of Examples 68-77, and further including means for receiving, in a receiver active state, first data from the remote link partner via the physical link; means for determining, in the receiver active state, whether the first data includes a low-power idle code; means for transitioning from the receiver active state to a receiver timer state in response to determining the first data includes the low-power idle code; means for starting a guard timer in response to transitioning to the receiver timer state; means for receiving, in the receiver timer state, second data from the remote link partner via the physical link; means for determining, in the receiver timer state, whether the second data includes the low-power idle code; and means for transitioning from the receiver timer state to a receiver sleep state in response to expiration of the guard timer and determining that the second data includes the low-power idle code.

Example 79 includes the subject matter of any of Examples 68-78, and further including means for transitioning from the receiver timer state to the receiver active state in response to determining that the second data does not include the low-power idle code.

Example 80 includes the subject matter of any of Examples 68-79, and wherein the physical link comprises a 40-gigabit copper cable connection or a 40-gigabit backplane connection, and wherein the physical link comprises four physical lanes.

Example 81 includes the subject matter of any of Examples 68-80, and wherein the physical link comprises a 100-gigabit copper cable connection, and wherein the physical link comprises 4 physical lanes or 10 physical lanes.

Example 82 includes a network port logic for low-power data communication, the network port logic comprising means for receiving, in an active state, first data from a remote link partner via a physical link; means for determining, in the active state, whether the first data includes a low-power idle code; means for transitioning from the active state to a timer state in response to determining the first data includes the low-power idle code; means for starting a guard timer in response to transitioning to the timer state; means for receiving, in the timer state, second data from the remote link partner via the physical link; means for determining, in the timer state, whether the second data includes the low-power idle code; and means for transitioning from the timer state to a sleep state in response to expiration of the guard timer and determining that the second data includes the low-power idle code.

Example 83 includes the subject matter of Example 82, and wherein the guard timer specifies a delay of at least 147 nanoseconds.

Example 84 includes the subject matter of any of Examples 82 and 83, and wherein the guard timer specifies a delay of at least 247 nanoseconds.

Example 85 includes the subject matter of any of Examples 82-84, and wherein guard timer specifies a delay of at least 500 nanoseconds.

Example 86 includes the subject matter of any of Examples 82-85, and further including means for transitioning from the timer state to the active state in response to determining that the second data does not include the low-power idle code.

Example 87 includes the subject matter of any of Examples 82-86, and further including means for receiving, in the sleep state, a plurality of rapid alignment markers from the remote link partner via the physical link, wherein each rapid alignment marker is indicative of a corresponding counter value that is selected from a sequence of values including a first counter value, a last counter value, and a next-to-last counter value.

Example 88 includes the subject matter of any of Examples 82-87, and further including means for determining whether a first rapid alignment marker of the plurality of rapid alignment markers is not indicative of the first counter value; and means for transitioning from the sleep state to a wake state in response to determining the first rapid alignment marker is not indicative of the first counter value.

Example 89 includes the subject matter of any of Examples 82-88, and wherein the means for determining whether the first rapid alignment marker is not indicative of the first counter value comprises means for determining whether the first rapid alignment marker is indicative of a counter value less than 255.

Example 90 includes the subject matter of any of Examples 82-89, and further including means for receiving, in the wake state, a second plurality of rapid alignment markers from the remote link partner via the physical link, wherein each rapid alignment marker is indicative of a corresponding counter value that is selected from the sequence of values including the first counter value, the last counter value, and the next-to-last counter value; means for determining, in the wake state, whether a second rapid alignment marker of the second plurality of rapid alignment markers is indicative of the first counter value; and means for transitioning from the wake state to the sleep state in response to determining the second rapid alignment marker is indicative of the first counter value.

Example 91 includes the subject matter of any of Examples 82-90, and wherein the means for determining whether the second rapid alignment marker is indicative of the first counter value comprises means for determining whether the second rapid alignment marker is indicative of a counter value equal to 255.

Example 92 includes the subject matter of any of Examples 82-91, and further including means for determining, in the wake state, whether the second rapid alignment marker is indicative of the last counter value; and means for transitioning from the wake state to the active state in response to determining the second rapid alignment marker is indicative of the last counter value.

Example 93 includes the subject matter of any of Examples 82-92, and wherein the means for determining whether the second rapid alignment marker is indicative of the last counter value comprises means for determining whether the second rapid alignment marker is indicative of a counter value equal to one.

Example 94 includes the subject matter of any of Examples 82-93, and further including means for determining, in the sleep state, whether a lane synchronization status is false; and means for transitioning from the sleep state to a quiet state in response to determining the lane synchronization status is false.

Example 95 includes the subject matter of any of Examples 82-94, and further including means for detecting, in the quiet state, signal energy from the remote link partner via the physical link; and means for transitioning from the quiet state to the wake state in response to detecting the signal energy.

Example 96 includes the subject matter of any of Examples 82-95, and further including means for transmitting, during a transmitter wake state, a plurality of rapid alignment markers to the remote link partner via the physical link, wherein each rapid alignment marker is indicative of a corresponding counter value that is selected from a sequence of values including a first counter value, a last counter value, and a next-to-last counter value; means for determining, during the transmitter wake state, whether the counter value of a first rapid alignment marker of the plurality of rapid alignment markers equals the next-to-last counter value and whether a low power idle command is set in response to transmitting the first rapid alignment marker; and means for transitioning from the transmitter wake state to a transmitter sleep state in response to determining the counter value of the first rapid alignment marker equals the next-to-last counter value and the low power idle command is set.

Example 97 includes the subject matter of any of Examples 82-96, and further including means for determining, during the transmitter wake state, whether the counter value of the first rapid alignment marker equals the last counter value in response to transmitting the first rapid alignment marker; and means for transitioning from the transmitter wake state to a transmitter active state in response to determining the counter value of the first rapid alignment marker equals the last counter value.

Example 98 includes the subject matter of any of Examples 82-97, and wherein the physical link comprises a 40-gigabit copper cable connection or a 40-gigabit backplane connection, and wherein the physical link comprises four physical lanes.

Example 99 includes the subject matter of any of Examples 82-98, and wherein the physical link comprises a 100-gigabit copper cable connection, and wherein the physical link comprises 4 physical lanes or 10 physical lanes.

The invention claimed is:

1. A network port logic for low-power data communication, the network port logic comprising:
   a physical coding sublayer (PCS) logic to:
   transmit, during a wake state, a plurality of rapid alignment markers to a remote link partner via a physical link, wherein each rapid alignment marker is indicative of a corresponding counter value that is selected from a sequence of values including a first counter value, a last counter value, and a next-to-last counter value;
   determine, during the wake state, whether the counter value of a first rapid alignment marker of the plurality of rapid alignment markers equals the next-to-last counter value and whether a low power idle command is set in response to transmission of the first rapid alignment marker; and
   transition from the wake state to a sleep state in response to a determination that the counter value of the first rapid alignment marker equals the next-to-last counter value and the low power idle command is set.

2. The network port logic of claim 1, wherein the PCS logic is further to:
   determine, during the wake state, whether the counter value of the first rapid alignment marker equals the last counter value in response to transmission of the first rapid alignment marker; and
   transition from the wake state to an active state in response to a determination that the counter value of the first rapid alignment marker equals the last counter value.

3. The network port logic of claim 2, wherein the next-to-last counter value equals two and the last counter value equals one.

4. The network port logic of claim 1, wherein the PCS logic is further to:
   receive, in a receiver active state, first data from the remote link partner via the physical link;
   determine, in the receiver active state, whether the first data includes a low-power idle code;
   transition from the receiver active state to a receiver timer state in response to a determination that the first data includes the low-power idle code;
   start a guard timer in response to a transition to the receiver timer state;
   receive, in the receiver timer state, second data from the remote link partner via the physical link;
   determine, in the receiver timer state, whether the second data includes the low-power idle code; and
   transition from the receiver timer state to a receiver sleep state in response to expiration of the guard timer and a determination that the second data includes the low-power idle code.

5. The network port logic of claim 4, wherein the PCS logic is further to transition from the receiver timer state to the receiver active state in response to a determination that the second data does not include the low-power idle code.

6. The network port logic of claim 1, wherein the physical link comprises a 40-gigabit copper cable connection or a 40-gigabit backplane connection, and wherein the physical link comprises four physical lanes.

7. The network port logic of claim 1, wherein the physical link comprises a 100-gigabit copper cable connection, and wherein the physical link comprises 4 physical lanes or 10 physical lanes.

8. A network port logic for low-power data communication, the network port logic comprising:
   a physical coding sublayer (PCS) logic to:
   receive, in an active state, first data from a remote link partner via a physical link;
   determine, in the active state, whether the first data includes a low-power idle code;
   transition from the active state to a timer state in response to a determination that the first data includes the low-power idle code;
   start a guard timer in response to a transition to the timer state;
   receive, in the timer state, second data from the remote link partner via the physical link;
   determine, in the timer state, whether the second data includes the low-power idle code; and transition from the timer state to a sleep state in response to expiration of the guard timer and a determination that the second data includes the low-power idle code.

9. The network port logic of claim 8, wherein the guard timer specifies a delay of at least 147 nanoseconds.

10. The network port logic of claim 8, wherein the guard timer specifies a delay of at least 247 nanoseconds.

11. The network port logic of claim 8, wherein the guard timer specifies a delay of at least 500 nanoseconds.

12. The network port logic of claim 8, wherein the PCS logic is further to transition from the timer state to the active state in response to a determination that the second data does not include the low-power idle code.

13. One or more non-transitory, computer-readable storage media comprising a plurality of instructions that in response to being executed cause a computing device to:
- transmit, during a wake state, a plurality of rapid alignment markers to a remote link partner via a physical link, wherein each rapid alignment marker is indicative of a corresponding counter value that is selected from a sequence of values including a first counter value, a last counter value, and a next-to-last counter value;
- determine, during the wake state, whether the counter value of a first rapid alignment marker of the plurality of rapid alignment markers equals the next-to-last counter value and whether a low power idle command is set in response to transmitting the first rapid alignment marker; and
- transition from the wake state to a sleep state in response to determining the counter value of the first rapid alignment marker equals the next-to-last counter value and the low power idle command is set.

14. The one or more non-transitory, computer-readable storage media of claim 13, further comprising a plurality of instructions that in response to being executed cause the computing device to:
- determine, during the wake state, whether the counter value of the first rapid alignment marker equals the last counter value in response to transmitting the first rapid alignment marker; and
- transition from the wake state to an active state in response to determining the counter value of the first rapid alignment marker equals the last counter value.

15. The one or more non-transitory, computer-readable storage media of claim 14, wherein the next-to-last counter value equals two and the last counter value equals one.

16. The one or more non-transitory, computer-readable storage media of claim 13, further comprising a plurality of instructions that in response to being executed cause the computing device to:
- receive, in a receiver active state, first data from the remote link partner via the physical link;
- determine, in the receiver active state, whether the first data includes a low-power idle code;
- transition from the receiver active state to a receiver timer state in response to determining the first data includes the low-power idle code;
- start a guard timer in response to transitioning to the receiver timer state;
- receive, in the receiver timer state, second data from the remote link partner via the physical link;
- determine, in the receiver timer state, whether the second data includes the low-power idle code; and
- transition from the receiver timer state to a receiver sleep state in response to expiration of the guard timer and determining that the second data includes the low-power idle code.

17. The one or more non-transitory, computer-readable storage media of claim 16, further comprising a plurality of instructions that in response to being executed cause the computing device to:
- transition from the receiver timer state to the receiver active state in response to determining that the second data does not include the low-power idle code.

18. One or more non-transitory, computer-readable storage media comprising a plurality of instructions that in response to being executed cause a computing device to:
- receive, in an active state, first data from a remote link partner via a physical link;
- determine, in the active state, whether the first data includes a low-power idle code;
- transition from the active state to a timer state in response to determining the first data includes the low-power idle code;
- start a guard timer in response to transitioning to the timer state;
- receive, in the timer state, second data from the remote link partner via the physical link;
- determine, in the timer state, whether the second data includes the low-power idle code; and
- transition from the timer state to a sleep state in response to expiration of the guard timer and determining that the second data includes the low-power idle code.

19. The one or more non-transitory, computer-readable storage media of claim 18, wherein the guard timer specifies a delay of at least 147 nanoseconds.

20. The one or more non-transitory, computer-readable storage media of claim 18, wherein the guard timer specifies a delay of at least 247 nanoseconds.

21. The one or more non-transitory, computer-readable storage media of claim 18, wherein the guard timer specifies a delay of at least 500 nanoseconds.

22. The one or more non-transitory, computer-readable storage media of claim 18, further comprising a plurality of instructions that in response to being executed cause the computing device to:
- transition from the timer state to the active state in response to determining that the second data does not include the low-power idle code.

* * * * *